INVENTOR
LAMBERT H. MOTT, 3rd
BY
Arthur B. Colvin
ATTORNEY

United States Patent Office 3,313,621
Patented Apr. 11, 1967

3,313,621
METHOD FOR FORMING POROUS SEAMLESS TUBING
Lambert H. Mott 3rd, Hartford, Conn., assignor to Mott Metallurgical Corp., Hartford, Conn., a corporation of Connecticut
Filed June 15, 1965, Ser. No. 464,675
11 Claims. (Cl. 75—212)

This invention relates to the art of porous metal tubing and more particularly to a method of forming the same.

As conducive to an understanding of the invention, it is noted that where a porous seamless tube is formed by applying longitudinal pressure in a mold or die to the metal powder from which the tube is formed, and then sintering such powder, if the ratio of the length of the tube to its diameter is greater than five, the center of the tube lengthwise would be of far less density than the ends of the tube due to die wall friction and depending upon the length of the tube such center portion could be substantially uncompacted by such pressure.

It is accordingly among the objects of the invention to provide a method which is relatively simple to perform, requiring a minimum of equipment and by means of which a porous seamless tube may be fabricated having a length to diameter ratio greater than five and in which the density of the tubing may be varied in a uniform fashion along its length, and in a controllable manner.

According to the invention, these objects are accomplished by the arrangement and combination of steps hereinafter described and more particularly recited in the claims.

Figure 1:
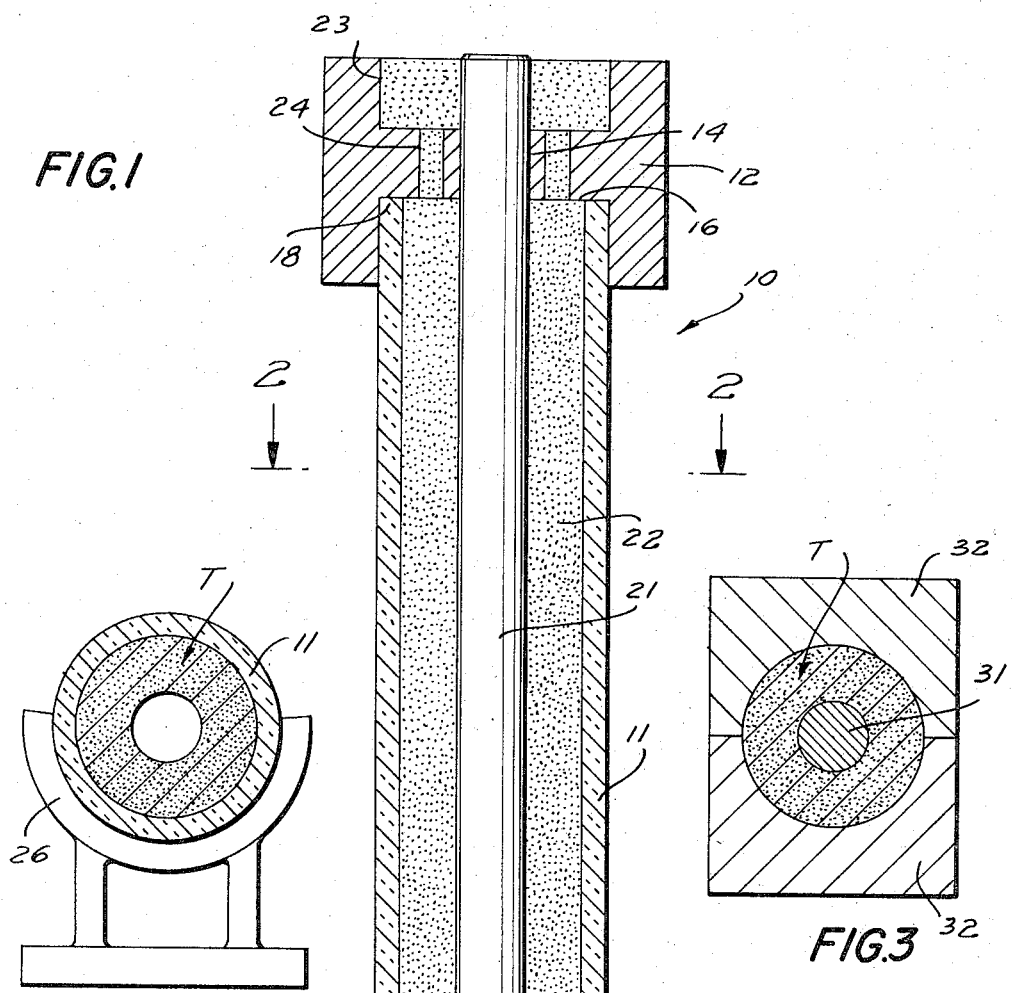
Figure 2:
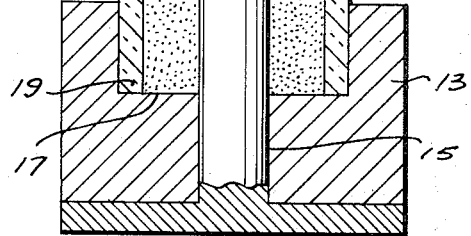
Figure 3:
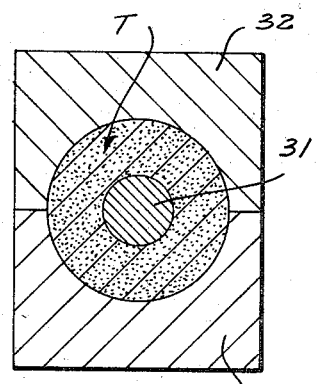

In the accompanying drawings in which is shown one of various possible equipments for practicing the method of the present invention, FIG. 1 is a longitudinal sectional view of a mold for forming the tubing, FIG. 2 is a transverse sectional view of the semi-fabricated tube in a holder, and FIG. 3 is a transverse sectional view of the tube in a swaging die.

The porous seamless tubing according to the present invention is made by first sieving any suitable sinterable powder to predetermined fractions and then reblending the same so as to obtain a specific particle size distribution which will determine the porosity of the finished tubing.

An aqueous solution is prepared of approximately four parts water to one part urea formaldehyde resin and from two to ten percent of such solution by weight is added to powder blended as above set forth, and the solution and powder are thoroughly mixed so that all of the powder particles will be completely wetted.

Thereupon, the powder is air dried for example at a temperature not exceeding 110° F. This is important for if the temperature is higher, proper curing which subsequently is to be performed will not occur.

As a result of such procedure, each particle will be covered with a resin coating. Thereupon, the dried powder is pulverized as by a mortar and pestle and passed through a sieve of size equal to that of the largest particle in the blend. If the manufacturing process is not being conducted with humidity controls, it is desirable to add from .05 to .2% zinc stearate to the pulverized powder.

The resultant pulverized resin coated particles are then charged into a suitable mold 10.

As shown in the drawing, the mold comprises a tube 11 of refractory material such as fused quartz, aluminum oxide or the like capable of withstanding a temperature of at least 2,000° F., while exposed to a hydrogen bearing atmosphere.

The tube 11 has caps 12, 13 secured to the ends thereof. Thus, as shown, each of the caps has an axial bore 14, 15 of enlarged diameter at its inner end defining a recess 16, 17 in which the associated end 18, 19 of the tube 11 is positioned.

Extending through the tube 11 and the bores 14, 15 of the end caps 12, 13 is a core rod 21 of suitable rigid material such as steel, aluminum or glass, for example. The core rod 21 defines an annular cavity 22 with respect to the tube 11. The lower end of the cavity 22 is closed by the end cap 13. The upper end of the cavity is in communication with an annular chamber 23 defined by an enlargement of bore 14 on the outer surface of end cap 12 through a plurality of passageways 24.

With the mold 10 in vertical position, the dried resin coated particles are poured into the annular chamber 23 while simultaneously vibrating the mold so that such particles will readily flow through the passageways 24 into the annular cavity 22 to fill the latter and achieve maximum particle packing.

After the cavity 22 is fully charged, the mold 10 is then heated to a temperature of approximately from 120 to 450° F.

As a result, the resin coating the particles will be cured and all of the particles will be securely bonded together to form an integral unit.

Thereupon, after cooling, the end caps 12 and 13 and central core rod 21 are removed, removal of the rod 21 being readily accomplished by reason of the contraction of the bonded particles on cooling thereof.

The refractory tube 11 with the semi-fabricated powder tube T contained therein is positioned in an oven on a holder 26 of suitable material resistant to a temperature of approximately 2,100° F. A suitable material for this purpose is graphite and the holder 26 should support at least 180° of the cross section of the tube 11 along its entire length.

Thereupon, the oven is heated in a hydrogen atmosphere to a temperature suitable for the metal particles being formed into the tube T, to pre-sinter such tube. Typical examples of temperatures that may be employed are 1,800° F. for Monel; 2,100° F. for steel; 1,500° F. for bronze. The pre-sintering time is approximately one-half hour and more particularly the temperature employed should be such that the outside diameter of the tube T shrinks from .001 to .020 of an inch.

At this time, the oven is permitted to cool to room temperature and the tube 11 with its contained pre-sinered tube T is then removed. By reason of the shrinkage of the outside diameter or the tube T it may readily be removed from tube 11 which is available for reuse.

As a result of the temperature employed during the pre-sintering operation, all of the resin will be completely burnt away and the resultant tube T will be completely free of metal particles being bonded together by the sintering process to form a porous member.

The porous tube T is then resintered at a temperature approximately 100 to 200° higher than previously employed. Where the tube T has a thin wall, the sintering is preferably done with refractory sand packing to prevent collapse thereof, thereby to inhibit distortion of the tube T.

The resintered tube T is then cleaned internally and externally as with a metal brush to remove any foreign particles from the surfaces and then a hardened steel mandrel 31 (FIG. 3) (Rockwell C45 minimum hardness) is inserted into the bore of the tube. With the mandrel 31 in place, the tube T is gauged to the desired wall thickness and outside diameter by means of two half round dies 32, the mandrel 31 limiting the inside diameter of the tube T. It has been found that this operation generally involves from 25 to 50% reduction in wall thickness.

Thereupon, the mandrel 31 is removed from the bore of tube T which is readily accomplished by reason of the natural spring back of the sintered material after the dies 32 are removed and the tube T is again sintered.

The tube T is then cut to the desired length and straightened by conventional straightening rollers and the interior and exterior of the tube are ground to provide the exact outer and inner diameters desired.

Since the various swaging and grinding operations may tend to clog some of the pores of the tube T, and electrolytic etching process is desirably performed to eliminate such clogging.

To this end, the tube T is immersed in say a 10% solution of oxalic acid in water. The porous tube T is connected to the anode of a direct current source of say from 6 to 12 volts. A cathode of aluminum, stainless steel or platinum, for example, is provided in the solution. Preferably, the anode is a tubular screen completely surrounding the tube T along its entire length.

The direct current potential is applied until all flowed metal resulting from the swaging and grinding operations has been removed from the surface of the tube T. This generally takes from 30 seconds to 6 minutes and the diameter of the tube is slightly reduced say in the order of .001 of an inch.

The tube T is then removed from the etching solution and thoroughly washed and cleaned to clear the pores of foreign matter such as salts, residual acids and the like. This cleaning may be done in any conventional manner such as by blowing through the wall of the tube T in both directions, while cleaning the tube with ultra-sonic vibration in commercial cleaning solutions.

After the tube T is cleaned it is then dried and inspected.

The tube T made by the method above described, has a porosity that may be controlled within very precise limits so that tube after tube made according to the method of the present invention will be substantially the same with negligible variation.

As many changes could be made in the above method, and many apparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent of the United States is:

1. The method of forming a porous seamless tube from sinterable metal particles, which comprises the steps of coating the particles of metal to be sintered with a thermosetting resin, charging the annular cavity of a mold defined between a tube of refractory material and a central rigid core of such mold, with such coated particles, heating the charged mold to a temperature sufficient to cure the resin but far below the sintering temperature of the metal particles, to form a semi-finished rigid tube in said refractory tube, thereupon after cooling of the mold, removing the core and heating the refractory tube with the semi-finished tube therein in a hydrogen atmosphere to the sintering temperature of the metal particles to burn away the resin thereby leaving a rigid porous metal tube.

2. The method set forth in claim 1 in which the mold is vibrated while it is being charged to compact the metal particles therein.

3. The method set forth in claim 1 in which the charged mold is heated to a temperature of from 120 to 450 degrees F. to cure the resin.

4. The method set forth in claim 1 in which the particles are of Monel and the sintering temperature is approximately 1,800 degrees F.

5. The method set forth in claim 1 in which the particles are of stainles steel and the sintering temperature is approximately 2,100 degrees F.

6. The method set forth in claim 1 in which the particles are of bronze and the sintering temperature is approximately 1,500 degrees F.

7. The method set forth in claim 1 in which the sintered tube is resintered at a temperature approximately 100 to 200 degrees higher than the temperature of the first sintering operation which is between 1500° to 2100° F.

8. The method set forth in claim 7 in which the bore of the semi-finished tube is packed with refractory sand prior to the second sintering operation.

9. The method set forth in claim 1 in which a hardened steel core rod of diameter substantially equal to the desired final inner diameter of the porous tube is inserted into the bore thereof and die members are forced against the outer surface of the porous tube to reduce the wall thickness of the tube to the desired amount.

10. The method set forth in claim 9 in which the inner and outer surfaces of the porous tube are mechanically cleaned prior to the compression of the wall thereof.

11. The method set forth in claim 9 in which the porous metal tube is electrolytically etched after its wall thickness has been reduced in order to eliminate clogging of the passageways through the tube.

References Cited by the Examiner

UNITED STATES PATENTS

| 2,390,160 | 7/1943 | Marvin | 75—222 |
| 2,792,302 | 5/1957 | Mott | 75—222 |
| 3,112,165 | 11/1963 | Davies | 75—200 |

FOREIGN PATENTS 781,433  8/1957  Great Britain.

CARL D. QUARFORTH, *Primary Examiner.*

BENJAMIN R. PADGETT, *Examiner.*

A. J. STEINER, *Assistant Examiner.*